(12) United States Patent
Helbig et al.

(10) Patent No.: US 8,510,875 B2
(45) Date of Patent: Aug. 20, 2013

(54) URINE DIVERTER WITH END OF LIFE CYCLE INDICATOR

(76) Inventors: Thomas Helbig, Russelsheim (DE);
Michael L. Higgins, Brea, CA (US);
Erik Brown, Brea, CA (US); Martin Oberlack, Seeheim-Jugenheim (DE);
Jorg Schaffner, Darmstadt (DE);
Martin Bremerich, Olsberg (DE);
Joerg-Michael Fitzke, Brilon (DE)

( * ) Notice: Subject to any disclaimer, the term of this patent is extended or adjusted under 35 U.S.C. 154(b) by 1178 days.

(21) Appl. No.: 11/633,073

(22) Filed: Dec. 4, 2006

(65) Prior Publication Data
US 2007/0209979 A1   Sep. 13, 2007

Related U.S. Application Data

(60) Provisional application No. 60/741,748, filed on Dec. 2, 2005, provisional application No. 60/752,861, filed on Dec. 21, 2005.

(51) Int. Cl.
*E03D 1/00* (2006.01)

(52) U.S. Cl.
USPC .............................................. 4/314

(58) Field of Classification Search
USPC ................ 73/306, 307, 444, 305, 309, 315,
73/322.5, 454; 116/110, 228, 229; 137/558;
4/300.3, 301, 314
See application file for complete search history.

(56) References Cited

U.S. PATENT DOCUMENTS

| | | | | |
|---|---|---|---|---|
| 2,631,183 | A * | 3/1953 | Babis | 73/444 X |
| 3,895,964 | A * | 7/1975 | Sakamoto | 429/91 |
| 4,074,025 | A * | 2/1978 | Miyagawa | 73/454 X |
| 5,661,238 | A | 8/1997 | Duksa | |
| 2005/0247342 | A1 | 11/2005 | Higgins | |

* cited by examiner

*Primary Examiner* — Lori Baker
(74) *Attorney, Agent, or Firm* — Lewis B. Sternfels

(57) ABSTRACT

An indicator that the cartridge is draining slowly is placed on top of the cartridge. When slow draining causes urine to pool on top of the cartridge, liquid enters a float housing, causing an indicator to change color. The indicator is visible through a lens in a diverter. The indicator may be a disk that undergoes a chemical reaction to change color or a float that flips over to reveal a side having a different color. When the cartridge is operating properly, the float displays a first color. Flipping of the float reveals a second color to the observer. A color change indicates, such as by signaling, that the cartridge needs to be replaced.

14 Claims, 6 Drawing Sheets

URINE DIVERTER WITH END OF LIFE CYCLE INDICATOR

This application claims benefit of provisional applications No. 60/741,748 filed Dec. 2, 2005 and No. 60/752,861, filed Dec. 21, 2005.

BACKGROUND OF THE INVENTION

Waterfree urinals (urinals that do not require flushing with water to block odors from emitting from the drain) utilize a cartridge attached to a drain, the drain leading to a sewer or septic system. Within the cartridge is a trap to contain liquid to prevent gases coming through the drain and escaping through the cartridge. Over time, precipitants from urine slow the draining ability and capacity of the cartridge. Over time, the cartridge drains too slowly to be useful, causing urine to back-up onto the top of the cartridge, as comprising an excessive amount of liquid. At this point, the entire cartridge must be replaced.

It is an object of the invention to provide a waterfree cartridge having a visual indicator to signal the end of its useful life.

It is another object of the invention to provide a waterfree cartridge having an indicator that may be removed and reused with a new cartridge.

These and other objects of the invention will become apparent to one of ordinary skill after reading the disclosure of the invention.

SUMMARY OF THE INVENTION

An indicator that the cartridge is draining slowly is placed on top of the cartridge having a first condition when dry and a second condition when exposed to a sufficient amount (e.g., an excessive amount) of liquid. When slow draining causes urine to pool on top of the cartridge, such excessive amount of liquid enters a float housing, causing a signaling indicator to change conditions, e.g., a signal such as color. The indicator is visible through a lens in a diverter. The indicator may be a disk, that undergoes a chemical reaction to change color or a float that flips over to reveal a side having a different color. When the cartridge is operating properly, the float displays a first color. Flipping of the float reveals a second color to the observer. A color change indicates or signals that the cartridge needs to be replaced. When flipping in response to liquid build-up, not only does the float operate not simply to sense the passage of waste water passing into the trap but also it remains flipped even after the water recedes, to notify the janitor or other observer of the existence of such excessive amount of liquid.

DETAILED DESCRIPTION OF THE INVENTION

Figure 1:
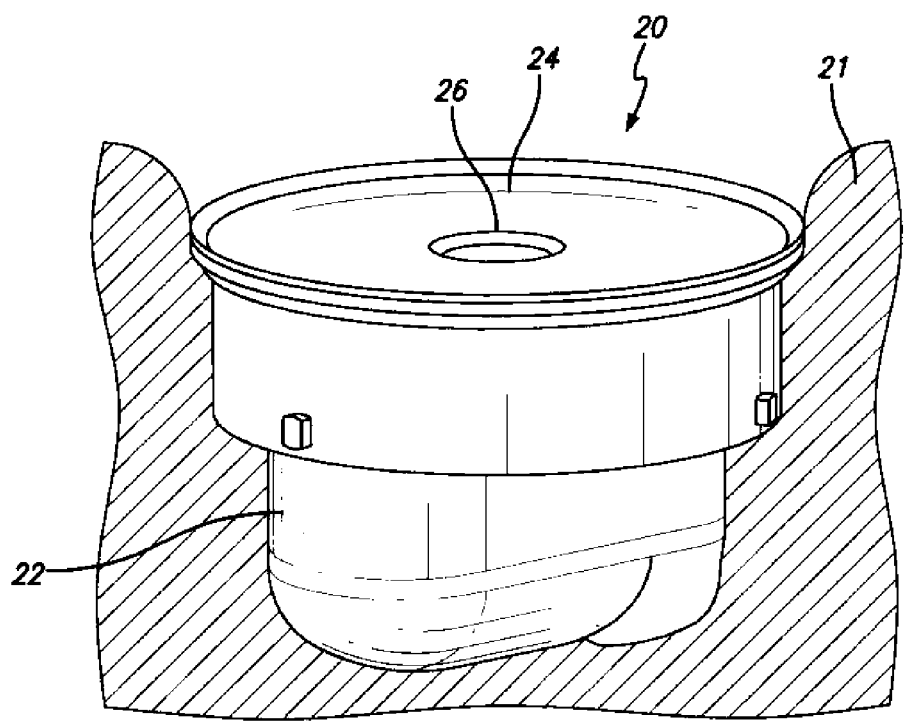
FIG. 1 is a perspective view of the waterfree cartridge.
Figure 2:
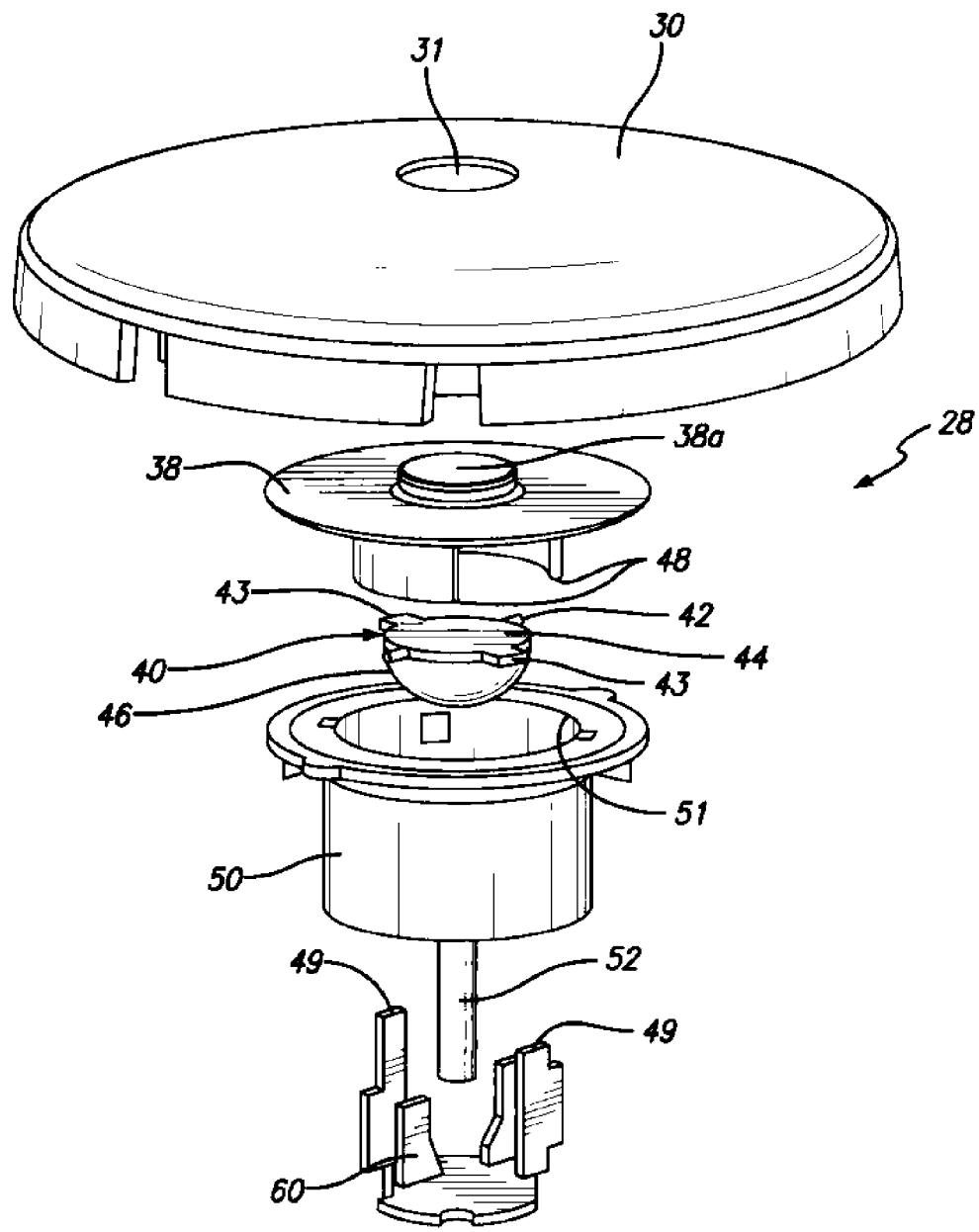
FIG. 2 is an exploded view of the indicator useful in conjunction with the cartridge illustrated in FIG. 1.

FIG. 1 depicts a cartridge 20 which may be housed within a urinal 21 and used with an indicator 28 as depicted in FIG. 2 et seq. The cartridge 20 has a housing 22 and a funnel-shaped top 24. The top 24 is provided with at least one drain hole 26 which is configured as a central cartridge top aperture. The cartridge housing 22 connects to a drain and has a trap, as is conventional, to prevent sewer gases from escaping through the cartridge.

An exploded view of the indicator is seen in FIG. 2. A urine diverter 30 to prevents any stream of liquid from being directed straight into the indicator. A central aperture allows a user visual access to the float 40 and lens 38 covers the central aperture. The float 40 has a float rotation axle 42, a flat top 44, which is a first condition, e.g., a signal such as the color green, and a rounded bottom 46, which is a second condition, e.g., a signal such as the color red. The float 40 rests within a float housing 50. An attachment stem 52 extends downwardly from the float housing and fits within a central aperture in the cartridge top 24 to secure the signaling indicator to the cartridge. A reset button 60 engages the bottom of the housing, as will be described later. The bottom also has apertures to allow the egress of liquids.

Figure 3:
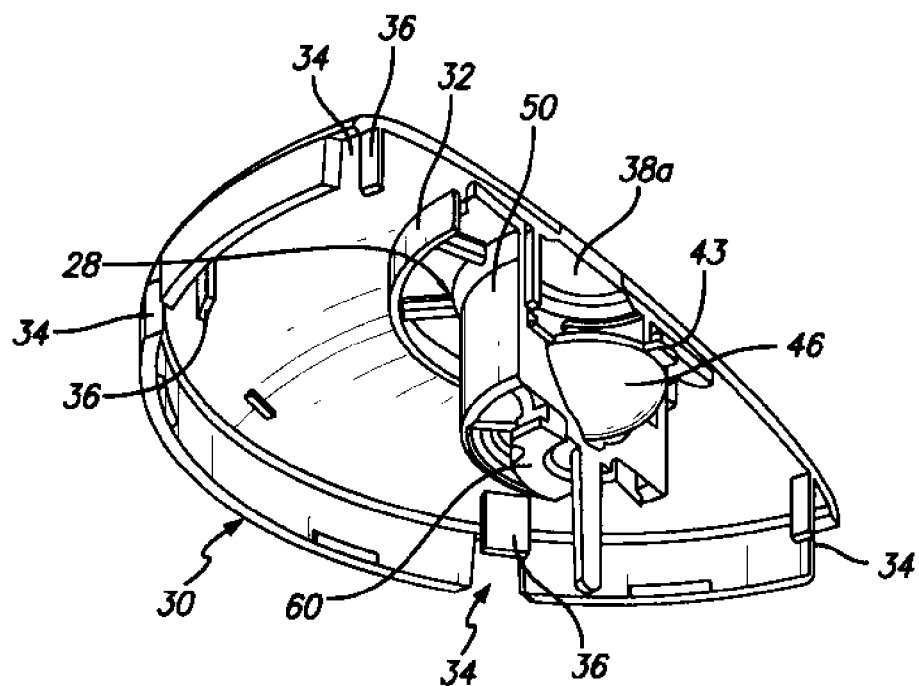
FIG. 3 is a bottom cross-sectional perspective view of the indicator.

The engagement between the float housing 50 and the diverter 30 is clearly seen in FIG. 3. An attachment collar 32 depends from the bottom surface of the baffle and secures the float housing in place. The top of clear lens insert and axle stop assembly 38, as comprising the clear lens 38a is sandwiched between the top of the float housing 50 and diverter 30. Air vents are provided at the top of the side wall of the housing to allow air to escape as liquid enters the float housing. The diverter is also provided with air vents 34 having baffles 36.

Figure 4:
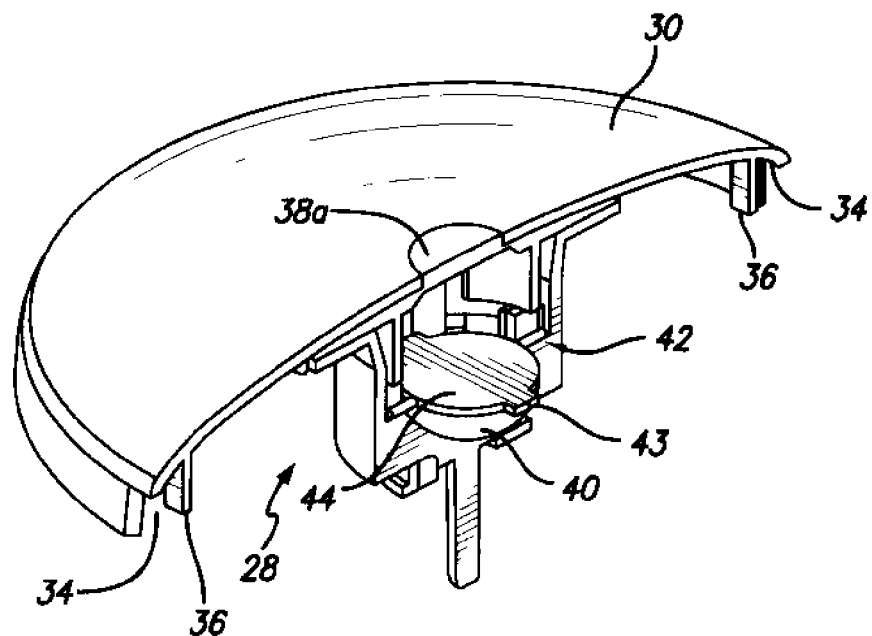
FIG. 4 is a top perspective cross-sectional view of the indicator.

FIG. 4 clearly depicts the float axle 42 fitting within a cradle formed within the float housing allowing the float to rotate or pivot about this axle. After attachment of the float housing to the diverter, the reset button is retracted to allow free float movement. The diverter is manipulated until the float exposes its top flat side 44 to the clear observation lens 38a. Once the float is in the proper position, the reset button is closed to lock the float in place. In the non-actuated position, with the green-colored flat side up, the float is in a stable position. The float is further maintained in this position by tabs 43 resting on the top surface of the reset button. When the cartridge approaches the end of its useful life, it begins to drain slower and slower.

Eventually, the point is reached where urine backs up onto the top of the cartridge to a height sufficient to allow urine to enter housing 50 through openings in the bottom of the float housing 50. The float will rise until the axle 42 contacts the bottom of the posts 48 extending from the clear lens insert and axle stop assembly 38. The float has positive buoyancy and, in an effort to rise further, will rotate or pivot about the axis 42 to expose the red side of rounded bottom 46 to the lens 38a, known as the actuated position. With slow draining, the level with decrease and the float will slowly sink until the tabs 43 again contact the top surface 49 of the reset button 60. The float then maintains the actuated position even if the cartridge completely drains. When the rounded bottom red side is visible, it is an indication that the cartridge must be replaced. The diverter and indicator may be reused.

Figure 5:
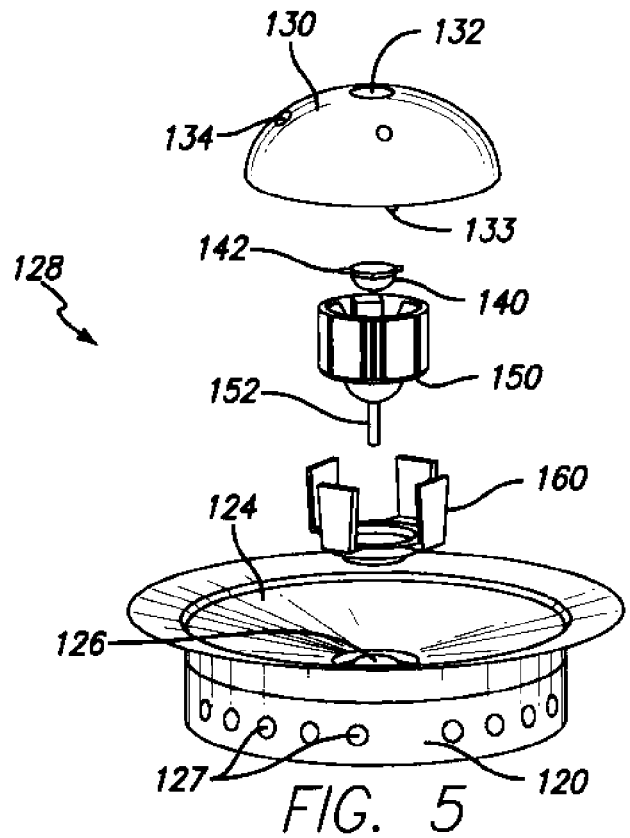
FIG. 5 is an exploded view of a second embodiment of the indicator.
Figure 6:
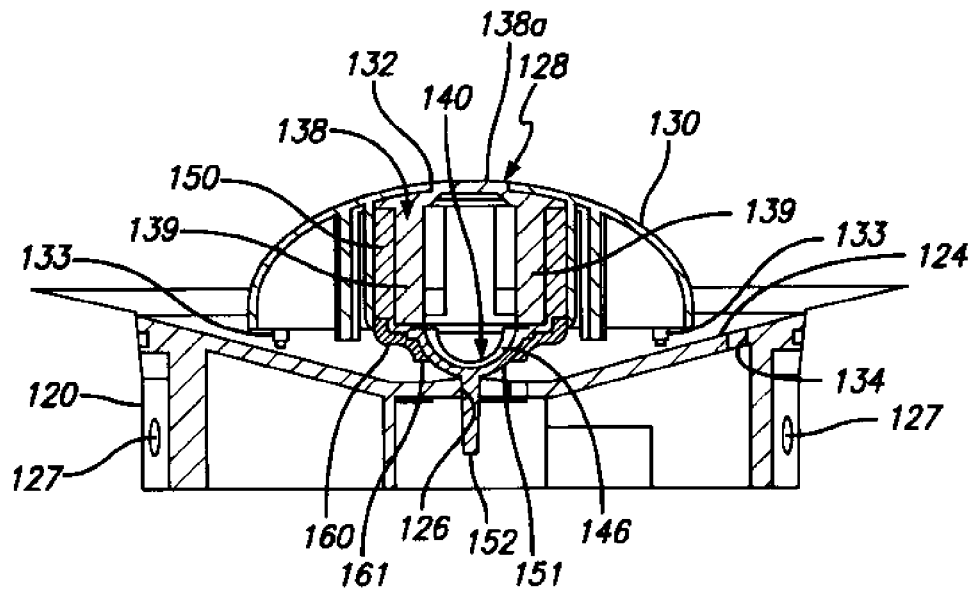
FIG. 6 is a cross-sectional view of the second embodiment of the indicator.

A second embodiment of the indicator can be seen in FIG. 5 with a cartridge housing 120 having top wall 124 having a central cartridge top aperture 126 and drain holes 127 (see also FIG. 6). A diverter 130 with vent holes 134 is dome-shaped and covers the remaining parts of the indicator to prevent a urine from being directed straight into the indicator and into the cartridge.

The indicator foot 150 provides a housing for the float 140. Similar to the first embodiment, the float 140 has a flat top surface of one color, e.g., a signal such as green and a rounded bottom surface which is a second color, e.g., a signal such as red. The float is hollow to create positive buoyancy and will rotate about the axis 142 when exposed to liquid.

The indicator foot has an attachment stem 152 extending from a rounded bottom 151 accommodating the rounded bottom 146 of the float. The indicator foot 150 fits within a central indicator cover aperture of a generally ring-shaped indicator cover 160, and the attachment stem has a friction fit within the central cartridge top aperture 126. Rounded bottom surface 151 of indicator foot 150 is disposed to reside within and be supported by cover 160.

The interengagement of the parts can clearly be seen in FIG. 6 with the cartridge 120 supporting the indicator. The float 140 rests within the indicator foot 150 and the cover 160 is connected to the indicator 150 by any conventional means, such as by gluing. The indicator foot also connects to the diverter by any conventional means, such as ultrasonic welding. Also seen in this view is the lens insert and axle stop assembly 138 having a central portion supporting clear lens 138a fitting within central (diverter) aperture 132 of the diverter 130 to give visual access to the float. Depending posts 139 of the clear lens insert and axle stop assembly 138 serve to retain the axle 142 of the float 140 between these posts 139 and rounded bottom 151 of the indicator foot 150, allowing rotation or pivoting of the float under the proper signaling conditions.

Figure 7:
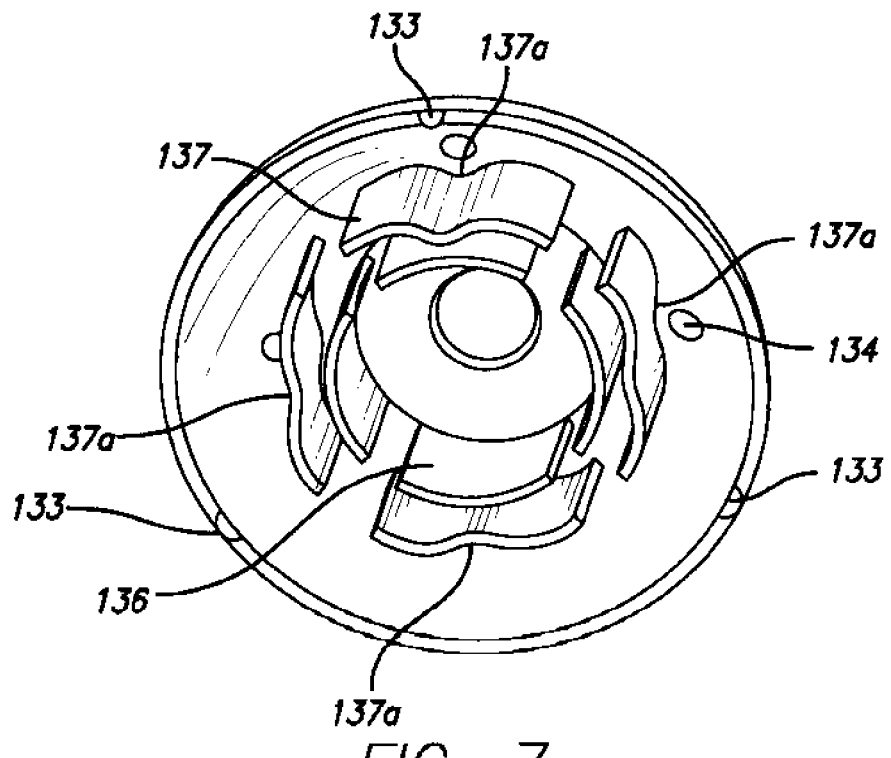
FIG. 7 is a bottom perspective view of the diverter in FIG. 5.

FIG. 7 shows the underside of the diverter 130. The perimeter of the diverter is provided with tabs 133 to keep the edge of the diverter spaced above the top surface of the cartridge 120 and allows liquid to pass underneath the diverter. Two sets of flanges 136 and 137 depend from the diverter. The first set of flanges 136 are arcuate sections, such as four, separated from one another. The second set of flanges 137 is located radially outwardly from the first set. The middle of each of flanges 137 is provided with a central arcuate portion 137a to space the flange from the vent holes 134 so that surface tension between the liquid and the flange will not cause the air vents 134 to be blocked. The air vents provide escape from air from underneath the diverter in response to rising liquid levels.

Figure 8:
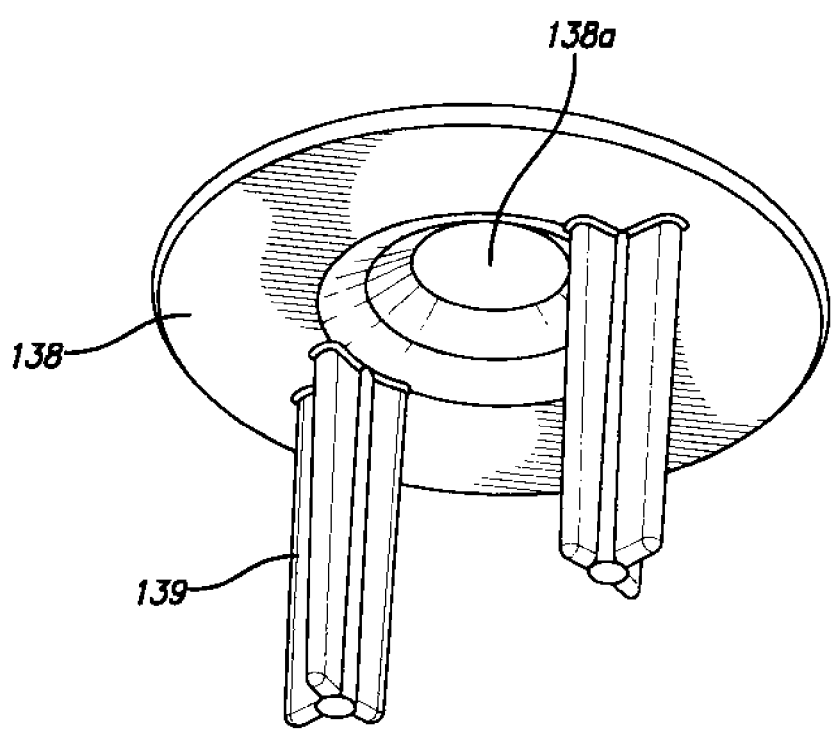
FIG. 8 is a bottom perspective view of the lens used in the second embodiment.

The clear lens insert and axle stop assembly 138 is more clearly seen in FIG. 8 with a raised central portion which supports transparent lens 138a and will fit within the central diverter aperture 132. Also seen is the pair of posts 139 having a generally T-shaped cross section.

Figure 9:
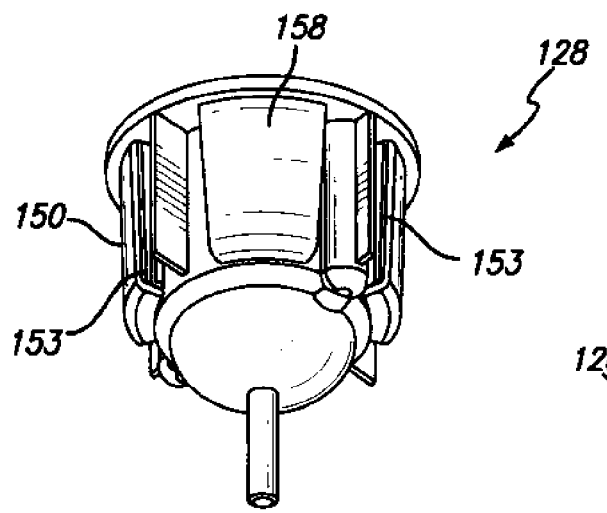
FIG. 9 is a bottom perspective view of the indicator foot with attachment stem.
Figure 10:
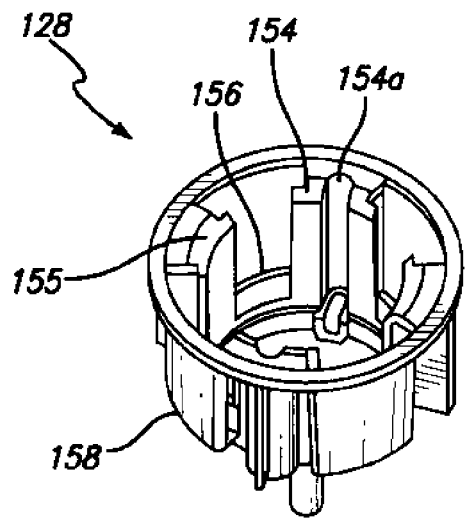
FIG. 10 is a top perspective view of the indicator foot.

The indicator foot 150 is depicted in FIGS. 9 and 10. The exterior surface of the foot 150 is provided with outwardly extending panels 158. These panels provide a surface for the cover 160 (see FIG. 11) to attach. Along each side of the panels 158 are slots 153 allowing the passage of liquid.

FIG. 10 shows details of the inner surface of the indicator foot. The inner surface is provided with four posts. Two of the posts 154 have a groove to accommodate the T-shaped lens post 139 whereas the other two posts 155 pass a smooth inner surface. A wall 156 extends between the posts, this wall 156 having a height which is less than the height of the post. As liquid backs up onto the top surface 124 of the cartridge, due to slow draining, liquid, as an excessive amount thereof, passes through the slots 153. When the liquid level rises above the height of the wall 156, it fills the arcuate bottom of the indicator foot where the float is housed, causing the float to rotate about the axis 142. The indicator foot cannot drain and the float is maintained in its actuated position.

Figure 11:
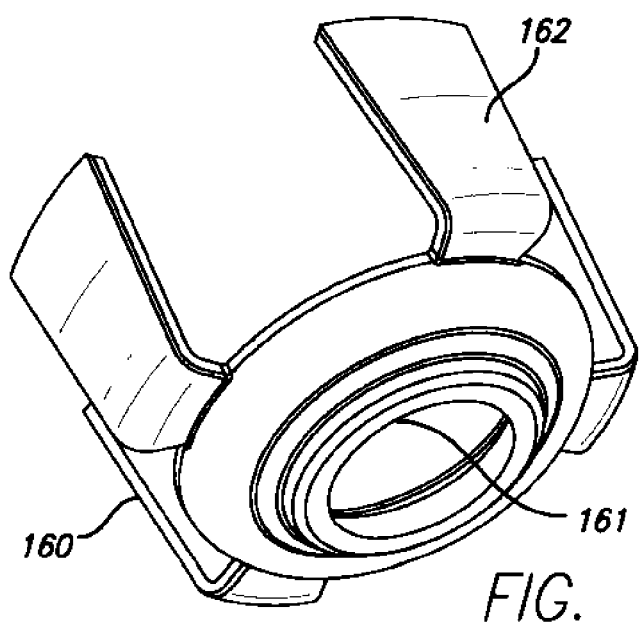
FIG. 11 is a bottom perspective view of the indicator cover.

FIG. 11 shows the indicator cover 160 having a series of panels 162 which, as described earlier, are attached to the panels 158 on the exterior of the indicator foot. Indicator cover 160 also includes an aperture 161 which provides a seat for rounded bottom 151 of indicator foot 150.

The invention has been described with reference to preferred embodiments. Variation and modification would be apparent to one of ordinary skill in the art and the invention encompasses such variations and modifications. For example, the float and its housing can be located under the cartridge top wall, at a level where liquid is not expected to rise. A lens or other means of allowing visual inspection of the float are then formed in the cartridge top wall. Also, a float and its housing assembly can be incorporated into a conventional ceramic urinal by again placing it at a level where urine is next expected to rise under proper working conditions.

What is claimed is:

1. A waterfree urinal receiving and disposing of waste liquids and mechanization therein to signal when an excessive amount of the liquid is inadequately disposed therefrom, comprising:
    a cartridge having a top surface receiving the liquids; and
    an indicator effecting the signal, said indicator comprising
        a housing, said housing positioned below said cartridge surface and having an aperture allowing ingress of the liquids, and
        a float, said float positioned within and pivotally supported by said housing about an axis and visible to the exterior of said cartridge, said float exhibiting a first condition when not exposed to any of the liquids and a second condition when exposed to the liquids, wherein said float, by being pivotally supported by said housing about the axis, is switched between said first and second conditions and, when in the second condition, said float remains in the second condition for observation by an observer.

2. A waterfree urinal, comprising:
    a cartridge having a top surface, said top surface having at least one aperture receiving liquidus matter ingressing said cartridge,
    an indicator positioned below said top surface, said indicator comprising
        a housing, said housing coupled to said cartridge surface and having an aperture, and
        a float capable of floating upon any excessive amounts of the liquidus matter, said float being mechanically positioned within said housing and visible to the exterior of said cartridge, said float displaying a first color in the presence of such excessive amounts of the liquidus matter and a second color when exposed to the liquidus matter, and said float is pivotally supported by said housing about an axis,
    wherein said float switches between said first and second colors by rotating about the axis to form a signal that distinguishes the first color from the second color and the relative existence and absence of the excessive amounts of the liquidus matter and, when displaying the second color, said float remains in the second condition for observation by an observer.

3. The urinal of claim 1, wherein said housing has a bottom and a seating aperture which seating aperture is positioned in the bottom of said housing.

4. A waterfree urinal comprising:
a cartridge having a top surface;
an indicator, said indicator comprising
   a housing, said housing positioned below said cartridge surface and having an aperture allowing for ingress of the liquids, and including a sidewall having drain holes therein, and
   a float, said float positioned within said housing and visible to the exterior of said cartridge, said float exhibiting a first condition when dry and a second condition when exposed to the liquids, and said float is pivotally supported by said housing about an axis and is switchable between said first and second conditions by pivoting about the axis.

5. A waterfree urinal, comprising:
a cartridge having a top surface, said top surface having at least one aperture receiving liquids ingressing said cartridge,
an indicator, said indicator comprising
   a housing, said housing positioned below said cartridge surface and having an aperture, and
   a rotatable float, said float being rotatably positioned within said housing and visible to the exterior of said cartridge, said float displaying a first color when dry and when in a first rotatable condition and a second color when exposed to the liquids and when in a second rotatable condition, and wherein said float has a flat top and a rounded bottom, said flat top being colored to identify the first color and said rounded bottom being colored differently from the first color to identify the second color and, when in the second rotatable condition, said float remains in the second rotatable condition for enabling it to be observed.

6. A waterfree urinal comprising:
a cartridge having a top surface, said top surface having at least one aperture for receiving liquids ingressing said cartridge; and
an indicator, said indicator comprising
   a housing, said housing positioned on said cartridge surface and having an aperture, and
   a rotatable float, said float being rotatably positioned within said housing and visible to the exterior of said cartridge, said float displaying a first color when dry and when in a first rotatable condition and a second color when exposed to the liquids and when in a second rotatable condition, and wherein said float has a flat top and a rounded bottom, said flat top being the first color and said rounded bottom being the second color, and
   a cover, said cover comprising a support having a central aperture, a plurality of flanges extending upwardly from said support and embracing said housing, and said rounded bottom being supported by said central aperture in said cover.

7. The urinal of claim 1, further comprising a diverter positioned above and supported by said cartridge top surface, said diverter providing an aperture enabling said float to be viable to the exterior of said cartridge.

8. The urinal of claim 7, further comprising a transparent lens positioned within said diverter aperture.

9. An indicator detecting excessive amounts of waste liquid in a urinal, said indicator comprising:
a surface having at least one aperture allowing for the ingress of the waste liquid;
a diverter above said surface, said diverter having an aperture; and
a float which is pivotally supported about an axis by and below said surface, which is visible through said diverter and surface apertures, which exhibits a first condition when dry when not exposed to the excessive amounts of the liquid and a second condition when exposed to the excessive amounts of the liquid, and which is switchable between said first and second conditions by pivoting about the axis color and, when in the second condition, said float remains in the second condition for observation by an observer.

10. The indicator of claim 9 wherein said float has opposed sides and the first and second conditions comprise first and second colors placed on said opposed sides of said float.

11. The indicator of claim 9, wherein said surface is embodied in a housing which has a bottom, and a seating aperture is positioned at said housing bottom.

12. An indicator, said indicator comprising:
a surface having at least one aperture allowing for the ingress of liquids;
a diverter above said surface, said diverter having an aperture; and
a float which is positioned within said diverter, which is visible through said diverter aperture, which exhibits a first condition when dry and a second condition when exposed to the liquids, which is pivotally supported by said diverter about an axis, and which is switchable between said first and second conditions by pivoting about the axis,
wherein said surface is supported by a housing which housing includes a sidewall having drain holes therein.

13. A waterfree urinal, comprising:
a cartridge having a top surface, said top surface having at least one aperture receiving waste liquids ingressing said cartridge,
an indicator indicating excessive amounts of the waste liquids, said indicator comprising
a housing, said housing having at least one aperture allowing the ingress of any excessive amounts of the waste liquids,
a signaling mechanism, said signaling mechanism being mechanically positioned within said housing and visible to the exterior of said cartridge, said signaling mechanism exhibiting a first condition when dry and when unexposed to the any excessive amounts of the waste liquids and a second condition when exposed to the any excessive amounts of the waste liquids, and wherein said signaling mechanism comprises a float pivotally supported within said housing color and, when in the second condition, said signaling mechanism remains in the second condition for observation by an observer.

14. The urinal of claim 13 further comprising a diverter positioned above said cartridge top surface and supporting said indicator, said diverter having an aperture enabling said float to be visible to the exterior of said cartridge.

* * * * *